United States Patent [19]

Senga et al.

[11] Patent Number: 5,856,403
[45] Date of Patent: Jan. 5, 1999

[54] PROCESS FOR PREPARING POLYARYLENE SULFIDE COPOLYMER, THE COPOLYMER PREPARED BY THE PROCESS, AND RESIN COMPOSITION COMPRISING THE COPOLYMER

[75] Inventors: Minoru Senga; Koji Namiki, both of Ichihara, Japan

[73] Assignee: Idemitsu Petrochemical Co., Ltd., Tokyo, Japan

[21] Appl. No.: 655,675

[22] Filed: May 30, 1996

[30] Foreign Application Priority Data

Jun. 26, 1995 [JP] Japan .................................... 7-182108
Jul. 14, 1995 [JP] Japan .................................... 7-201317

[51] Int. Cl.$^6$ ..................................................... C08L 51/00
[52] U.S. Cl. ................................ 525/64; 525/69; 525/71; 525/74; 525/78; 525/80; 525/189; 525/537; 525/191
[58] Field of Search ..................................... 525/535, 191, 525/207, 222, 308, 285, 63, 64, 69, 71, 74, 78, 80, 189, 537

[56] References Cited

U.S. PATENT DOCUMENTS 5,612,401   3/1997   Brown et al. ............................. 525/64

*Primary Examiner*—Mark L. Warzel
*Attorney, Agent, or Firm*—Oblon, Spivak, McClelland, Maier & Neustadt, P.C.

[57] ABSTRACT

A process for efficiently manufacturing polyarylene sulfide copolymer in which polymers are well dispersed and which copolymer exhibiting superior mechanical properties. The process comprises reacting a polyarylene sulfide resin (A) and an amination agent (B) in a non-protonic organic solvent (C), and copolymerizing the resulting amino polyarylene sulfide resin (A') and a reactive elastomer (D) in a non-protonic organic solvent (C'), thereby obtaining a polyarylene sulfide resin (A") with the elastomer dispersed in the resin matrix.

10 Claims, No Drawings

PROCESS FOR PREPARING POLYARYLENE SULFIDE COPOLYMER, THE COPOLYMER PREPARED BY THE PROCESS, AND RESIN COMPOSITION COMPRISING THE COPOLYMER

BACKGROUND OF THE INVENTION

1. Field of the Invention:

The present invention relates to a process for preparing a polyarylene sulfide copolymer, the copolymer prepared by the process, and a resin composition comprising the copolymer. More particularly, the present invention relates to a process for preparing a polyarylene sulfide copolymer which is particularly useful as a material for various electrical and electronic parts; and parts for transportation equipment such as vehicles, to the copolymer prepared by the process; and to a resin composition comprising the copolymer.

2. Discussion of the Background:

In recent years, techniques of polymer blends and polymer alloys are used to improve characteristics of polymers, and the research related to these techniques are actively undertaken. The polymer blends and polymer alloys are commonly manufactured by kneading polymers by an extruder. A number of melt blend compositions of polyarylene sulfide resin and various other resins with improved characteristics have been disclosed.

Among these, a method for simply melting and kneading polyarylene sulfide having an amino group together with various types of reactive polymers was disclosed, for example, by Japanese Patent Application Laid-open No. 153262/1992 and No. 202363/1992.

In these techniques, however, there were problems that the amino group contained in the polyarylene sulfide does not sufficiently react with the reactive polymer due to incompatibility between the polymers and that dynamic characteristics are not necessarily improved due to inadequate dispersion of the polymers.

The present invention has been completed to solve these problems and has an object of providing a process for preparing a polyarylene sulfide copolymer exhibiting excellent dispersibility with other polymers and having superior dynamic characteristics, and a resin composition comprising this copolymer of polyarylene sulfide.

SUMMARY OF THE INVENTION

To achieve this object the present invention provides a process for preparing a polyarylene sulfide copolymer comprising: reacting a polyarylene sulfide resin (A) and an amination agent (B) in a non-protonic organic solvent (C), and copolymerizing the resulting amino polyarylene sulfide resin (A') and a reactive elastomer (D) in a non-protonic organic solvent (C'), thereby obtaining a polyarylene sulfide resin (A") with the elastomer dispersed in the resin matrix.

In a prefer red embodiment of the present invention, the concentration of the polyarylene sulfide resin (A) when this resin is reacted with the amination agent (B) is 10–2000 g/l of the non-protonic organic solvent (C); the proportion of the amination agent (B) is 0.05–10 mol % for one basic mol of the polyarylene sulfide resin (A); and the proportion of the resulting amino polyarylene sulfide resin (A') and the reactive elastomer (D) is (A'):(D)=99–50 wt %:1–50 wt %.

In another preferred embodiment of the present invention, said non-protonic organic solvent (C) is N-methyl-2-pyrrolidone.

To achieve the above object the present invention further provides a polyarylene sulfide copolymer prepared by the above-described process, and, in particular, a polyarylene sulfide resin wherein elastomer particles dispersed in the matrix resin have an average diameter of less than 0.2 μm.

To achieve the above object the present invention further provides a resin composition comprising 100 parts by weight of said polyarylene sulfide copolymer and 0–400 parts by weight of an organic or inorganic filler.

Other objects, features and advantages of the invention will hereinafter become more readily apparent from the following description.

DETAILED DESCRIPTION OF THE INVENTION AND PREFERRED EMBODIMENTS

Preferred embodiments of the invention will be hereinafter described.

I. Preparation of Polyarylene Sulfide Copolymer

1. The Reaction of the Polyarylene Sulfide Resin (A) and the Amination Agent (B) (Amination Reaction)

In the present invention, the polyarylene sulfide resin (A) and the amination agent (B) are first reacted in a non-protonic organic solvent (C). The amino polyarylene sulfide resin (A') can be obtained by this reaction.

(1) Reaction Components and Solvents

① Polyarylene Sulfide Resin (A)

Polyarylene sulfide (PAS) resin (A) used in the present invention is a polymer containing 70 mol % or more of a recurring unit represented by —Ar—S—, wherein Ar is an arylene group. A typical polyarylene sulfide is a polyphenylene sulfide containing 70 mol % or more of a recurring unit represented by the following formula (I),

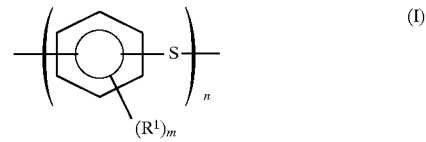

wherein $R^1$ is a group selected from the group consisting of alkyl groups having 6 or less carbon atoms, alkoxy groups having 6 or less carbon atoms, a phenyl group, carboxylic group, a cyano group, and a halogen atom; m is an integer of 0–4; and n denotes the average polymerization degree and is selected from the range of 1.3–30. In particular, an α-chloronaphthalene solution (concentration: 0.4 g/dl) having a logarithmic viscosity at 206° C. in the range of 0.1–0.5 dl/g, preferably 0.13–0.4 dl/g, and more preferably 0.15–0.35, is suitable. The melt viscosity measured at 310° C. and a shear rate of 200/sec is preferably 10 to 20,000 poise, and more preferably 100 to 5,000 poise, There are two types of PAS depending on the method of manufacturing; one is PAS having a substantially linear structure with no branch or cross-link, and the other is PAS having a branched or cross-linked structure. Both types can be used in the present invention. A preferred PAS in the present invention is a homopolymer or copolymer which comprises 70 mol % or more, preferably 80 mol % or more, of a paraphenylene sulfide unit as a recurring unit. If the proportion of this recurring unit is less than 70 mol %, the crystalinity which is inherently possessed by a crystalline polymer is insufficient and it is difficult to ensure adequate mechanical characteristics. As the copolymerization unit for the PAS, an m-phenylene sulfide unit, an o-phenylene sulfide unit, a p,p'-diphenylene ketone sulfide unit, a p,p'-diphenylene sulfone sulfide unit, a p,p'-biphenylene sulfide unit, a p,p'-diphenylene ether sulfide unit, a 2,6-naphthalene lsulfide unit, and the like are given as examples. In addition to the above-mentioned substantially linear polymers, branched or cross-linked polyarylene sulfide obtained by polymerizing a monomer mixture which contains a small amount of monomers having three or more functional groups can be used. A blend of said linear polyarylene sulfide and these branched or cross-linked polyarylene sulfides is also preferably used. A polymer with improved molding processability, which is obtained by increasing the melt viscosity by oxidative cross-linking or thermal cross-linking of a linear polymer having a comparatively low molecular weight, is also preferably used as the component (A) in the present invention.

② Amination Agent (B)

There are no specific limitations to the amination agent (B) used in the present invention. A compound having (i) an amino group and a thiol group, a compound having (ii) a combination of amino group and thiol group and an alkaline compound, and (iii) a compound having an amino group and a thiolate group (—SM, wherein M denotes an alkali metal or an alkaline earth metal) are given as examples. It is also possible to use a suitable combination of two or more of these compounds (i) to (iii).

Given as examples of the compound (i) are p-aminothiophenol, o-aminothiophenol and aminoalkyl mercaptane. p-Aminothiophenol and o-aminothiophenol are preferred.

As the alkaline compound of the compound (ii), any compounds which can convert the thiol group to thiolate group can be used. Specific examples are hydroxides or carbonates of alkali metal or alkaline earth metal. A mixture of a hydroxide and carbonate may also be used. Preferred compounds are alkali metal hydroxides, with sodium hydroxide being particularly preferred.

Metal salts of p-aminothiophenol, o-aminothiophenol, aminoalkyl mercaptane, and the like are given as examples of the compound (iii).

③ Non-protonic Organic Solvent

As the non-protonic organic solvent (C), non-protonic polar organic compounds (e.g., amide compounds, lactam compounds, urea compounds, organic sulfur compounds, cyclic organic phosphorous compounds, etc.) are preferably used either as a single solvent or a mixed solvent.

Given as examples of the amide compounds among these non-protonic polar organic compounds are N,N-dimethylformamide, N,N-diethylformamide, N,N-dimethylacetamide, N,N-diethylacetamide, N,N-dipropylacetamide, and N,N-dimethylbenzoic acid amide.

The following compounds are given as examples of the lactam compounds. Caprolactam; N-alkyl caprolactams, such as N-methylcaprolactam, N-ethylcaprolactam, N-isopropylcaprolactam, N-isobutylcaprolactam, N-n-propylcaprolactam, N-n-butylcaprolactam, and N-cyclohexylcaprolactam; N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, and N-methyl-3-ethyl-2-piperidone.

Tetramethyl urea, N,N'-dimethylethylene urea, N,N'-dimethylpropylene urea, and the like are given as examples of the urea compounds.

Further, given as examples of the organic sulfur compounds are dimethyl sulfoxide, diethyl sulfoxide, diphenyl sulfone, 1-methyl-1-oxosulforane, 1-ethyl-1-oxosulforane, and 1-phenyl-1-oxosulforane.

These various non-protonic organic solvents can be used as the non-protonic organic solvent (C) individually, mixed with other non-protonic organic solvent, or mixed with other solvent components which do not affect the object of the present invention.

Preferred non-protonic organic solvents among those mentioned above are N-alkyl caprolactam and N-alkyl pyrrolidone, and especially preferred is N-alkyl pyrrolidone.

(2) Reaction Conditions

There are no specific limitations to the reaction (an amination reaction) between the PAS (A) and the amination agent (B) in the non-protonic organic solvent (C), so long as such conditions allows the PAS (A) to be aminated. Preferred conditions are now illustrated.

① Concentration and Proportion of Components (i) The concentration of polyarylene sulfide resin (A) is preferably 10–2,000 g, and more preferably 50–1,500 g, per litter of the non-protonic organic solvent (C). If this concentration is less than 10 g, the productivity is lowered; if more than 2,000 g, the rate of reaction decreases and side reactions may occur.

(ii) The proportion of the amination agent (B) for one base mol of the polyarylene sulfide (A) is preferably 0.05–10 mol %, and more preferably 0.3–5 mol %. If less than 0.05 mol %, the amination reaction may be insufficient, the average particles size of the elastomer will be increased, and the desired dynamic characteristics may not be obtained; if more than 10 mol %, the molecular weight of the aminated PAS (A') may be decreased.

② Reaction Temperature

The amination reaction temperature in the present invention is preferably 180°–300° C., and more preferably 220°–280° C. If this temperature is lower than 180° C., precipitate of PAS (A) remains so that the amination reaction may not sufficiently proceed; if higher than 300° C., PAS (A) may be deteriorated.

③ Reaction Time

The reaction time of the amination fsreaction in the present invention is affected by the temperature differences and, therefore, cannot be generically defined. Usually, the reaction time in the range 10 minutes to 10 hours is preferable, with a more preferable range being from 30 minutes to 5 hours. If shorter than 10 minutes, the reaction may not sufficiently proceed. The reaction time longer than 10 hours decreases the productivity, induces side reactions, and may result in decreased molecular weight of the produced amino PAS (A') compound.

2. Copolymerization of PAS (A') and Reactive Elastomer (D)

In the present invention, the aminated polyarylene sulfide resin (A') contained in the residue after the above amination reaction is copolymerized with the reactive elastomer (D) which is added to the reaction system, whereby the polyarylene sulfide resin (A") in which the elastomer is dispersed in the resin matrix can be obtained in one step. The same solvent as the non-protonic organic solvent (C) used in the amination reaction can be used as the non-protonic organic solvent (C').

(1) Reaction Components

① Reactive Elastomer (D)

There are no specific limitations to the reactive elastomer (D) used for the copolymerization in the present invention inasmuch as the elastomer has a functional group which can react with amino group. Reactive polyolefin elastomers having a functional group can be given as the example.

A specific example is the reactive polyolefin elastomer obtained by the copolymerization of monomers consisting of 50–90 wt % (preferably 60–85 wt %) of ethylene, 5–49 wt % (preferably 7–45 wt %) of α, β-unsaturated carboxylic acid alkyl ester, and 0.5–10 wt % (preferably 1–8 wt %) of a monomer containing a functional group.

The α,β-unsaturated carboxylic acid alkyl ester used here may be an alkyl ester of carboxylic acid having 3–8 carbon atoms, such as alkyl esters of acrylic acid or methacrylic acid. Specific examples include methyl acrylate, ethyl acrylate, n-propyl acrylate, isopropyl acrylate, n-butyl acrylate, i-butyl acrylate, methyl methacrylate, ethyl methacrylate, n-propyl methacrylate, isopropyl methacrylate, n-butyl methacrylate, and i-butyl methacrylate. Ethyl acrylate, n-butyl acrylate, and ethyl methacrylate are particularly preferred.

There are also no specific limitations to the monomer containing a functional group. Monomers containing an acid anhydride group, an epoxy group, an amino group, an amide group, a hydroxy group, an acid chloride group, or an isocyanate group are given as examples. Specific compounds are maleic acid anhydride, glycidyl acrylate, acrylic acid, glycidyl methacrylate, methacrylic acid, and the like. Of these compounds, maleic acid anhydride and glycidyl methacrylate are preferred.

(2) Reaction Conditions

There are no specific limitations to the copolymerization reaction between the aminated PAS (A') and the reactive elastomer (D), so long as such conditions allows the aminated PAS (A') to react with the reactive elastomer (D). Preferred conditions are as follows.

① Concentration and Proportion of Components

The amount of the reactive elastomer (D) used in the present invention, in terms of the ratio in wt % of amino polyarylene sulfide resin (A'): the reactive elastomer (D) is preferably 99–50:1–50, and more preferably 97–80:3–20. If the amount of the reactive elastomer (D) is less than 1 wt %, improvement in the dynamic characteristics such as impact resistance is insufficient; if more than 50 wt %, heat resistance and dimensional precision stability may be unduly affected.

② Reaction Temperature

The polymerization reaction temperature in the present invention is preferably 180°–300° C., and more preferably 220°–280° C. If this temperature is lower than 180° C., precipitate of aminated PAS (A') remains so that the copolymerization reaction may not sufficiently proceed; if higher than 300° C., not only the aminated PAS (A') may be deteriorated, but also its molecular weight may be decreased.

③ Reaction Time

The reaction time of the substitution reaction in the present invention is affected by the temperature differences and, therefore, cannot be generically defined. Usually, the reaction time in the range 10 minutes to 10 hours is preferable, with a more preferable range being from 30 minutes to 5 hours. If shorter than 10 minutes, the copolymerization reaction may not sufficiently proceed; if longer than 10 hours, the productivity may be decreased.

3. Post Treatment

In the present invention the amination reaction and the copolymerization reaction are successively carried out. After these reactions, post treatments comprising filtration, washing with water and organic solvents (acetone, alcohol), drying are carried out, whereby the polyarylene sulfide resin (A") with the elastomer dispersed in the resin matrix is obtained.

II. Polyarylene Sulfide Copolymer and the Resin Composition Comprising the Same

The polyarylene sulfide copolymer of the present invention can be obtained as the polyarylene sulfide copolymer (A") by the manufacturing process described above.

The elastomer particles dispersed in the matrix resin of this polyarylene sulfide copolymer (A") have preferably an average diameter of less than 0.2 μm.

This average diameter was measured by electron microscope on test leaves prepared by injection molding of pellets which were prepared from the copolymer using a 20 mm φ extruder.

The resin composition of the present invention can be contained by incorporating an inorganic or organic filler in said copolymer.

① Organic or Inorganic Filler

The filler (E) used for the resin composition of the present invention may be either an inorganic compound or an organic compound. Either a single filler or a mixture of two or more fillers can be used.

Such a filler may be either in the form of fiber or may take a non-fibrous form. Specifically, depending on the purpose for obtaining the molded products with excellent mechanical properties, heat resistance, dimensional stability (stability against deformation and warping), electrical properties, and the like, fillers in the form of fiber, powders, particles, or plates can be used. Given as examples of fibrous fillers are inorganic fibrous materials, such as glass fiber, asbestos fiber, carbon fiber, silica fiber, silica-alumina fiber, zirconia fiber, boron nitride fiber, silicon nitride fiber, boron fiber, potassium titanate fiber, and metal fibers such as stainless fiber, aluminum fiber, titanium fiber, copper fiber, and bronze fiber. Glass fiber and carbon fiber are typical fibrous fillers. Beside these fibrous fillers high melting point organic fibrous materials such as aromatic polyamide, fluorine resins, and acrylic resins can be used. On the other hand, given as examples of powdery or particle fillers are carbon black, molten or crystalline silica, quartz powder, glass beads, glass powder, silicates such as calcium silicate, aluminum silicate, kaolin, talc, clay, diatomaceous earth, and wallusnite; metal oxides such as iron oxide, titanium oxide, zinc oxide, and alumina; metal carbonates such as calcium carbonate and magnesium carbonate; metal sulfates such as calcium sulfate and barium sulfate; silicon carbide, boron nitride, and various metal powders. Mica, glass flakes, and various metallic foils are given as examples of plate-like fillers. These inorganic fillers may be used either individually or in combination of two or more. The combination of a fibrous filler, particularly glass fiber or carbon fiber, and a particulate filler and/or a plate-like filler is preferred for providing both the mechanical strength and other characteristics such as dimensional precision, electrical characteristics, and the like. As required, it is desirable to use a converging agent or a surface treatment agent together with these fillers. Functional compounds such as epoxy compounds, isocyanate compounds, silane compounds, and titanate compounds are given as examples of the converging agent or the surface treatment agent. It is possible to carry out the surface treatment or the converging treatment of the fillers using these compounds in advance or these compounds may he added when blending the raw materials. The amount of the filler used is 400 parts by weight or less, preferably 10–300 parts by weight for 100 parts by weight of the PAS (A). Although there are no specific limitation to the lower side amount, mechanical strength and rigidity may be impaired depending on the application of the molded product if this amount is less than 10 parts by weight. If more than 400 parts by weight, not only it is difficult to carry out the molding operation, but also the molded product may have poor dynamic characteristics.

In the resin composition of the present invention, it is possible to use a small amount of other thermoplastic resins as the base polymer together with the PAS (A) to the extent that the purpose of the present invention is not interfered. Any thermoplastic resin which is stable at high temperatures may be used as the other thermoplastic resin. The examples include aromatic polyester resins made from aromatic dicarboxylic acid, such as polyethylene terephthalate or polybutylene terephthalate, and a diol or an oxycarboxylic acid; polyamide resins, such as Nylon 6, Nylon 6-6, Nylon 6-10, Nylon 12, and Nylon 46; olefin resins containing olefins such as ethylene, propylene, and butene as the major component; styrene resins such as polystyrene, polystyreneacrylonitrile, ABS resin; polycarbonate, polyphenylene oxide, polyalkylacrylate, polyacetal, polysulfone, polyether sulfone, polyether imide, polyether ketone, fluorine resin, and the like. These thermoplastic resins may be used either individually or in combination of two or more of them.

In addition to these components, various known additives commonly used for thermoplastic resins, such as stabilizers (e.g. antioxidants, UV absorbers), antistatic agents, flame retardants, colorants (e.g. dyes, pigments), lubricants, and releasing agents, may be added to the resin composition of the present invention depending on the characteristics required for the composition.

Various factors affect dispersibility of the elastomer in the present invention, such as stirring conditions during kneading, the viscosity of resin, and the like. Among these factors, the proportion of PAS (A') and reactive elastomer (D) and the amount of the resulting PAS-reactive elastomer copolymer (A") exhibit particularly significant effects. That is to say, the dispersibility of the elastomer is significantly affected by both the amount of the amination agent (B) and the proportion of PAS (A') and reactive elastomer (D).

For instance, in a system wherein the amination agent (B) is present in an amount of one mol or more for one basic mol of the recurring unit in the PAS (A), the copolymerization with a number of reactive elastomers (D) is possible. As a result, it is possible to maintain the dispersibility of less than 2 μm at the wt % ratio of the PAS (A') and the reactive elastomer (D) of as close as 50:50. This ratio of the PAS (A') and the reactive elastomer (D) may be increased to as large as 85:15 when the amount of the amination agent (B) is about 0.1 mol.

As illustrated above, the present invention provides a process for efficiently produce a polyarylene sulfide copolymer with the elastomer dispersed well in the resin matrix and having superior dynamic characteristics (especially impact strength).

The copolymer or the resin composition obtained by the process of the present invention, in the form of pellets made by injection molding, contains the elastomer with an average particle size of 2 μm or smaller dispersed in the matrix. The resin composition exhibits superior characteristics, particularly impact strength, far surpassing conventional polyarylene sulfide or kneaded products made therefrom.

Other features of the invention will become apparent in the course of the following description of the exemplary embodiments which are given for illustration of the invention and are not intended to be limiting thereof.

EXAMPLES

<Synthesis of PAS>

883 mol of hydrated sodium sulfide ($Na_2S \cdot 5H_2O$), 830 mol of LiCl, and 510 l of N-methyl-2-pyrrolidone (NMP) were charged in a polymerization vessel equipped with a stirrer and the mixture was held at 145° C. under reduced pressure for one hour to dehydrate. After cooling, 883 mol of p-dichlorobenzene (PCB) was added and the polymerization reaction was carried out at 260° C. for three hours. The resulting product was washed five times with hot water, once with NMP at 170° C. and three times with water, and dried at 185° C. to obtain polyarylene sulfide resin (PAS). The PAS has a logarithmic viscosity of 0.35. This polyarylene sulfide resin is herein designated as PAS1.

<Confirmation of the Amination Step>

[Reference Example 1]

1.5 kg of PAS1, 1.74 g (0.0139 mol) of o-aminothiophenol (o-ATP) (manufactured by Wako Pure Chemical Industries, Ltd.), 0.58 g (0.0146 mol) of sodium hydroxide (manufactured by Wako Pure Chemical Industries, Ltd.), 3.75 l (38.96 mol) of NMP (manufactured by Mitsubishi Chemical Co., Ltd.), as a solvent, and 193.1 ml of ion-exchanged water were placed in a 10 l autoclave and reacted at 250° C. for one hour. After cooling, the reaction mixture was filtered, the residue was washed successively with water and acetone, and dried under reduced pressure to obtain 1.48 kg of a white powder of aminated PAS. The amount of the amino group introduced into this product was measured by IR to confirm that the amination agent used for the reaction was quantitatively reacted with the PAS. The aminated PAS thus obtained is herein designated as PAS2. The logarithmic viscosity of PAS2 was 0.24.

[Reference Example 2]

An aminated PAS was prepared in the same manner as in Reference Example 1, except that the amount of o-ATP used was 0.87 g (0.0070 mol) and the amount of sodium hydroxide was 0.20 g (0.0146 mol). The amount of the amino group introduced into this product was quantitatively measured. The aminated PAS obtained is herein designated as PAS3. The logarithmic viscosity of PAS3 was 0.28.

[Reference Example 3]

An aminated PAS was prepared in the same manner as in Reference Example 1, except that the amount of o-ATP used was 0.58 g (0.0046 mol) and the amount of sodium hydroxide was 0.19 g (0.0049 mol). The amount of the amino group introduced into this product was quantitatively measured. The aminated PAS obtained is herein designated as PAS4. The logarithmic viscosity of PAS4 was 0.30.

The quantitative occurrence of the amination reaction was confirmed by the above Reference Examples 1–3. In addition, based on the amination reacion conditions it is apparent that the amino group has been introduced into polymer terminals.

<Preparation of Copolymer from Aminated PAS and Reactive Elastomer>

In the following Examples 1–5, the reactions of aminated PAS and reactive olefin elastomer are shown. The aminated PAS's used were PAS2 in Examples 1–3, PAS3 in Example 4, and PAS4 in Example 5. These aminated PAS's were reacted with a reactive olefin elastomer.

[Example 1]

1.5 kg of PAS1, 1.74 g (0.0139 mol) o-ATP, 0.58 g (0.0146 mol) of sodium hydroxide, 3.75 l (38.96 mol) of NMP, as a solvent, and 193.1 ml of ion-exchanged water were placed in a 10 l autoclave and reacted at 250° C. for one hour. After the reaction, the valve was slowly opened to distill 300 ml of a mixture of water and NMP.

The autoclave was cooled to 200° C. or lower. After the addition of Bondyne AX8390™ (manufactured by Sumika-Atochem Co., Ltd., a copolymer of ethylene, ethyl acrylate and maleic anhydride), as a reactive olefin elastomer, the mixture was heated to 260° C. and reacted at this temperature for one hour. After cooling to room temperature, the reaction mixture was filtered, the residue was washed repeatedly with water and acetone, and dried at 100° C. under vacuum for 20 hours. The copolymer thus obtained was melted at a temperature of 320° C. and made into pellets using a 20 mmφ axial extruder. Test leaves were prepared from the pellets at a resin temperature of 300° C. and die temperatures of 135° C. and 100° C. Izod strength (conforming to ASTM D256), bending strength (conforming to ASTM D790), and surface gloss (conforming to JIS K7105) were evaluated. The results of measurement of these characteristics and average particle size of dispersed elastomers are shown in Table 1.

[Example 2]

The same experiment as in Example 1 was carried out except that the amount of the reactive olefin elastomer were dry blended and then melt-kneaded at 320° C. by a 20 mmφ extruder. The characteristics of the kneaded product obtained were evaluated in the same manner as Example 1. The results of the measured characteristics and average particle size of dispersed elastomers are shown in Table 1.

[Comparative Example 3]

1.5 kg of PAS2 obtained in Reference Example 1 and 264 g of the reactive olefin elastomer (Bondyne AX8390™) were dry blended and then melt-kneaded at 320° C. by a 20 mmφ extruder. The characteristics of the kneaded product obtained were evaluated in the same manner as Example 1. The results of the measured characteristics and average particle size of dispersed elastomers are shown in Table 1.

TABLE 1

|  | PAS1(A) (wt %) | PAS2(A') (wt %) | PAS3(A') (wt %) | PAS4(A') (wt %) | Reactive elastomer (D) (wt %) | Izod without notch (MPa) | Bending strength (MPa) | Bending elasticity (Gpa) | Particle size of elastomer (μm) |
|---|---|---|---|---|---|---|---|---|---|
| Example 1 | — | 90 | — | — | 10 | Not broken | 104 | 4.0 | <0.2 |
| Example 2 | — | 85 | — | — | 15 | Not broken | 94 | 3.7 | <0.2 |
| Example 3 | — | 70 | — | — | 30 | Not broken | 88 | 2.7 | <0.2 |
| Example 4 | — | — | 85 | — | 15 | Not broken | 96 | 3.7 | <0.2 |
| Example 5 | — | — | — | 85 | 15 | 90 | 90 | 3.7 | 0.4 |
| Comparative Example 1 | 100 | — | — | — | 0 | 18 | 108 | 4.8 | — |
| Comparative Example 2 | 85 | — | — | — | 15 | 58 | 94 | 3.3 | 1.2 |
| Comparative Example 3 | — | 85 | — | — | 15 | 50 | 80 | 3.3 | 1.3 |

Note 1:
The amount of the amination agent (B) for one basic mol of recurring unit of PAS:
Examples 1–3 and Comparative Example 3: 1 mol %
Example 4: 0.5 mol %
Example 5: 0.33 mol %
Note 2:
The composition of Comparative Example 3 is a dry blend of PAS2 and the reactive elastomer (D).

(Bondyne AX8390™) used was 264 g. The results are shown in Table 1.

[Example 3]

The same experiment as in Example 1 was carried out except that the amount of the reactive olefin elastomer (Bondyne AX8390™) used was 643 g. The results are shown in Table 1.

[Example 4]

The same experiment as in Example 1 was carried out except that the amount of o-ATP used was 0.87 g (0.0070 mol) and the amount of sodium hydroxide was 0. 29 g (0.0146 mol). The results are shown in Table 1.

[Example 5]

The same experiment as in Example 1 was carried out except that the amount of o-ATP used was 0.58 g (0.0046 mol) and the amount of sodium hydroxide was 0.19 g (0.0049 mol), the amount of the reactive olefin elastomer (Bondyne AX8390™) used was 264 g. The results are shown in Table 1.

[Comparative Example 1]

The PAS1 used in Reference Example 1 was melt-kneaded at 320° C. by a 20 mmφ extruder. The characteristics of the kneaded product obtained were evaluated in the same manner as Example 1. The results are shown in Table 1.

[Comparative Example 2]

1.5 kg of PAS1 prepared in Reference Example 1 and 264 g of the reactive olefin elastomer (Bondyne AX8390™)

Obviously, numerous modifications and variations of the present invention are possible in light of the above teachings. It is therefore to be understood that, within the scope of the appended claims, the invention may be practiced otherwise than as specifically described herein.

What is claimed is:

1. A process for preparing a polyarylene sulfide copolymer comprising: reacting a polyarylene sulfide resin (A) and an amination agent (B) in a non-protonic organic solvent (C), and copolymerizing the resulting amino polyarylene sulfide resin (A') and a reactive elastomer (D) in a non-protonic organic solvent (C'), thereby obtaining a polyarylene sulfide resin (A") with the elastomer dispersed in the resin matrix.

2. The process for preparing a polyarylene sulfide copolymer as claimed in claim 1, wherein the concentration of the polyarylene sulfide resin (A) when this resin is reacted with the amination agent (B) is 10–2000 g/l of the non-protonic organic solvent (C); the proportion of the amination agent (B) is 0.05–10 mol % for one basic mol of the polyarylene sulfide resin (A); and the proportion of the resulting amino polyarylene sulfide resin (A') and the reactive elastomer (D) is (A'):(D)=99–50 wt %:1–50 wt %.

3. The process for preparing a polyarylene sulfide copolymer as claimed in claim 1, wherein said non-protonic organic solvent (C) is N-methyl-2-pyrrolidone.

4. A polyarylene sulfide copolymer prepared by the process defined in claim 1.

5. The polyarylene sulfide copolymer as claimed in claim 4, wherein elastomer particles dispersed in the matrix resin have an average diameter of less than 0.2 μm.

6. A resin composition comprising 100 parts by weight of the polyarylene sulfide copolymer claimed in claim 4 and 0–400 parts by weight of an organic or inorganic filler.

7. The process for preparing a polyarylene sulfide copolymer as claimed in claim 2, wherein said non-protonic organic solvent (C) is N-methyl-2-pyrrolindone.

8. A polyarylene sulfide copolymer prepared by the process defined in claim 2.

9. The polyarylene sulfide copolymer as claimed in claim 8, wherein elastomer particles dispersed in the matrix resin have an average diameter of less than 2 μm.

10. A resin composition comprising 100 parts by weight of the polyarylene sulfide copolymer claimed in claim 8 and 0–400 parts by weight of an organic or inorganic filler.

* * * * *